April 2, 1963     C. D. SWALM     3,083,398
ANTI-THEFT GROCERY CART CASTER
Filed Aug. 8, 1960
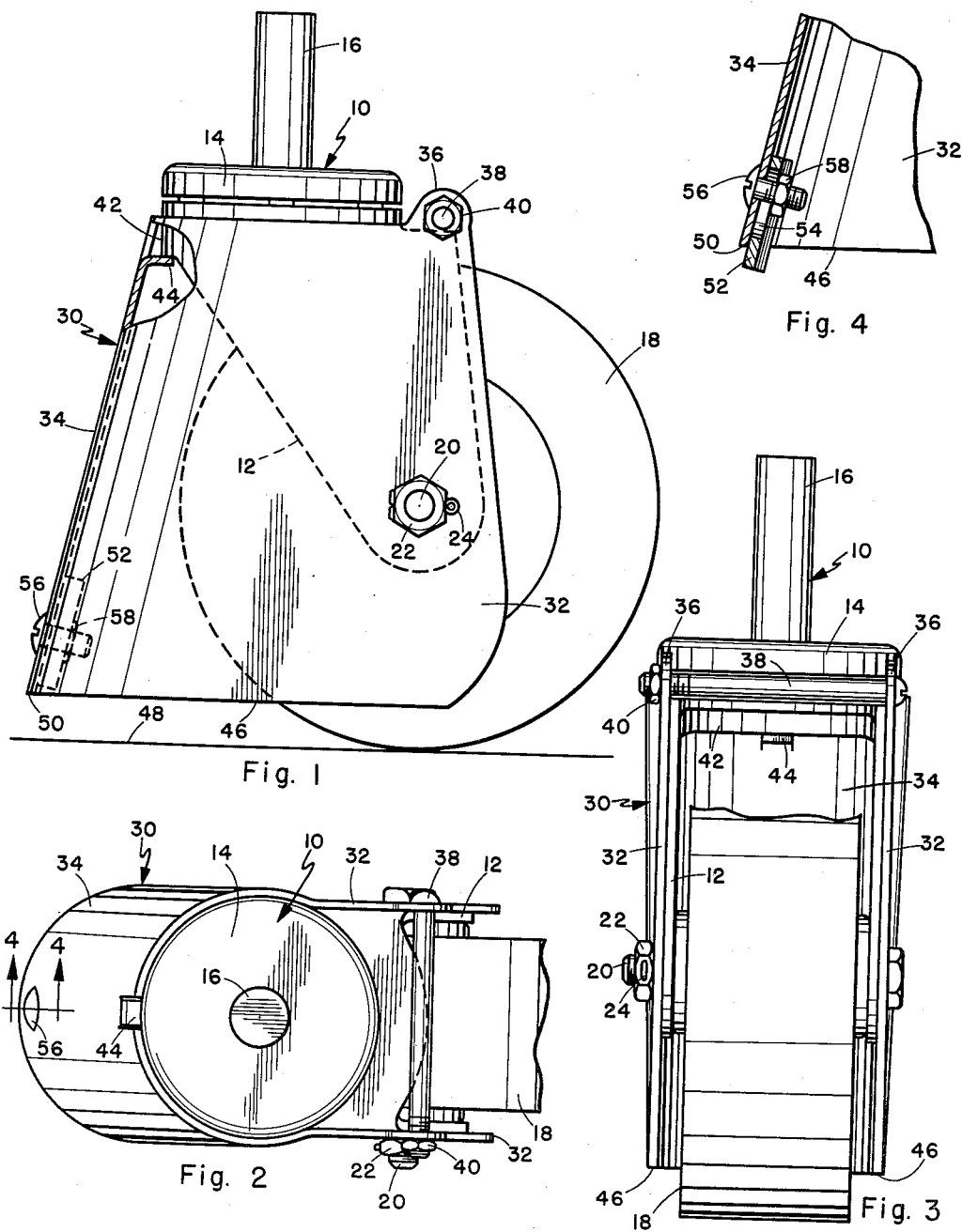
INVENTOR.
CALVIN D. SWALM
BY Knox & Knox

United States Patent Office 3,083,398
Patented Apr. 2, 1963

3,083,398
ANTI-THEFT GROCERY CART CASTER
Calvin D. Swalm, 4138 Cass, San Diego, Calif.
Filed Aug. 8, 1960, Ser. No. 48,118
1 Claim. (Cl. 16—18)

The present invention relates generally to casters and more particularly to an anti-theft grocery cart caster.

The majority of grocery stores and food markets use self-service baskets of wire construction mounted on caster type wheels. A major problem is the loss of large numbers of these baskets by theft or by failure to return the baskets after using them to transport their contents home. In many instances, the baskets are used to carry groceries out to the parking lot and adequate supervision of the baskets is impractical. Since the floor of a food market is normally smooth and level and the parking lot is usually reasonably smooth, it is feasible to make the carts easy to roll on smooth surfaces but impossible to roll on uneven surfaces or over obstructions. While it is still possible to carry the baskets over obstructions, the inconvenience is a deterrent to removal from the intended area and will prevent all but determined efforts at theft.

The primary object of this invention, therefore, is to provide a caster for use on grocery carts and the like, the caster having a shield with a forwardly extending portion, the lower edge of which is closely spaced from the floor or ground surface and has a ground engaging forward edge which jams against any small obstruction such as a ridge, stone, or merely uneven ground, so that normal rolling of the cart is prevented.

Another object of this invention is to provide an anti-theft caster utilizing a shield which can be rigidly attached to various types of conventional casters, without requiring modification of the casters, thus being adaptable to the large number of grocery carts in present use.

A further object of this invention is to provide an anti-theft caster having an adjustable ground engaging element by which the caster can be made to jam on various types of surfaces according to the nature of the particular surroundings.

Finally, it is an object to provide an anti-theft grocery cart caster of the aforementioned character which is simple and convenient to manufacture and install and which will give generally efficient and durable service.

With these and other objects definitely in view, this invention consists in the novel construction, combination and arrangement of elements and portions, as will be hereinafter fully described in the specification, particularly pointed out in the claim, and illustrated in the drawing which forms a material part of this disclosure, and in which:

FIGURE 1 is a side elevation view of the complete caster and shield, a portion being cut away;

FIGURE 2 is a top plan view of the assembly;

FIGURE 3 is a rear elevation view thereof; and

FIGURE 4 is a fragmentary sectional view taken on the ilne 4—4 of FIGURE 2.

Similar characters of reference indicate similar or identical elements and portions throughout the specification and throughout the views of the drawing.

The caster 10 is of conventional type, having a yoke 12 swivelling on a spindle bearing 14 with an upwardly extending attaching spindle 16 for securement to the leg or other portion of the structure to be supported. The yoke 12 carries a wheel 18 on an axle 20, the axle normally being a bolt held in place by a nut 22 and locked by a cotter pin 24. The yoke 12 is offset with the axle 20 disposed to one side of the axis of spindle 16, so that the wheel 18 trails in rolling motion, the structure and action being well known.

The caster 10 is partially enclosed in a shield 30, preferably bent from a unitary piece of sheet metal and having a pair of side plates 32 connected by a curved front portion 34, the shield being substantially U-shaped in its horizontal cross section. The shield 30 is secured primarily by the axle 20, the side plates 32 resting flat on the outside faces of the yoke 12, the upper rear corners of the side plates having lugs 36 which are connected by a retaining bolt 38 and nut 40. The upper edges of the side plates 32 and front portion 34 wrap closely around the bearing housing 42, which constitutes the upper part of the yoke 12, the front portion having an inwardly turned stop tab 44 which engages the underside of said bearng housing for additional rigidity, as in FIGURE 1.

The bottom edges 46 of side plates 32 are horizontal and closely spaced from the ground surface, indicated at 48 in FIGURE 1, the front portion 34 sloping downwardly and forwardly to a ground engaging front lip 50 at the lower edge thereof.

In normal rolling motion the shield 30 is disposed ahead of the wheel 18 due to the castering action. On smooth surfaces, such as the floor of a food market or a properly surfaced parking lot, the casters do not impede the use of a grocery cart mounted thereon, the cart not being shown in the drawing, since the structure is well known and not a critical part of the present disclosure. Any attempt to remove the grocery cart over uneven ground or obstructions causes the front lip 50 on each caster 10 to jam into the ground or obstruction and stop the cart from rolling. In grass or soft ground, the bottom edges 46 also jam and prevent movement. The cart may, of course, be lifted bodily over obstructions, but such determined efforts will remove virtually any cart regardless of precautions. The jamming action of the casters is intended primarily to deter unauthorized use of the carts beyond the intended area, many carts being removed without intent to steal, but not returned due to inconsideration.

In order to provide adjustment to suit various surface conditions, the shield 30 is fitted with a ground engaging tongue 52 mounted inside the front portion 34 adjacent the lower edge. The tongue 52 has a longitudinal slot 54 and is held by a locking screw 56 through said slot and the front portion 34, the screw being secured by a nut 58. The tongue 52 can be adjusted to extend beyond the front lip 50, as in FIGURE 4, to decrease the ground clearance and cause jamming of the caster on minor obstructions. Where it is desired to discourage removal of the carts from the building itself, a simple raised bead or strip across each doorway is sufficient to jam the carts. Casters of the type illustrated are common and are generally standardized dimensionally, so the shield 30 may be made in sizes to fit standard casters. The shield and caster assembly may be made as a unit or the shields made separately for attachment to existing casters, the operation merely entailing the removal of the axle and its replacement with the shield in place.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention. The specification and drawing are to be considered as merely illustrative rather than limiting. One such other embodiment of my invention envisages the placement of the shield inside the yoke 12 rather than on the outside thereof. It is noteworthy also that the term "grocery cart" employed herein is used in its broadest sense, including all such items as shopping carts and similar nesting carts, not necessarily used in grocery stores.

I claim:

In combination: a grocery cart for use in a store, susceptible to theft; a swivelling trailer-type castor mounted on said cart, said caster having a yoke, and a wheel mounted in said yoke, an axle retaining said wheel; a theft-deterring shield enclosing only the front of said caster; said shield having a pair of spaced side plates extending externally of said yoke and secured by said axle; a leading portion of said shield having a lower lip interconnecting said side plates and extending inflexibly downwardly and forwardly of the trailing castor at a height that just clears the floor at said store, but engages any rough ground outside the store; said caster having an attaching spindle and spindle bearing; the upper portion of said shield fitting closely around a portion of said spindle bearing; retaining means interconnecting the upper rear corners of said side plates for preventing said shield from tilting forward and for preventing said leading portion from digging into the floor of the store, the lower lip of said leading portion of said shield extending closely adjacent to a plane normal to said attaching spindle and through the bottom of said wheel; the upper edge of said leading portion of said shield having an inwardly turned stop tab engaging the underside of a portion of said yoke between said side plates; and a ground engaging tongue mounted on said leading portion; said tongue being adjustable to extend below the lip of the lower portion of the shield.

References Cited in the file of this patent

UNITED STATES PATENTS

| | | |
|---|---|---|
| 2,129,579 | Herold | Sept. 6, 1938 |
| 2,483,241 | Shepherd | Sept. 27, 1949 |
| 2,830,545 | Robinson et al. | Apr. 15, 1958 |